US006970948B2

(12) United States Patent
Brown et al.

(10) Patent No.: US 6,970,948 B2
(45) Date of Patent: Nov. 29, 2005

(54) CONFIGURING SYSTEM UNITS USING ON-BOARD CLASS INFORMATION

(75) Inventors: Roger S. Brown, deceased, late of London (GB); by Joanna Susan Flanders, legal representative, London (GB); Karen C. Roles, Send (GB); Simon G. Applebaum, Eton Wick (GB)

(73) Assignee: Sun Microsystems, Inc., Santa Clara, CA (US)

( * ) Notice: Subject to any disclaimer, the term of this patent is extended or adjusted under 35 U.S.C. 154(b) by 419 days.

(21) Appl. No.: 09/828,494

(22) Filed: Apr. 5, 2001

(65) Prior Publication Data

US 2002/0023181 A1 Feb. 21, 2002

Related U.S. Application Data

(63) Continuation of application No. PCT/GB99/03334, filed on Oct. 8, 1999.

(30) Foreign Application Priority Data

| Oct. 9, 1998 | (GB) | ............................................. 9822132 |
| Oct. 9, 1998 | (GB) | ............................................. 9828200 |

(51) Int. Cl.[7] ........................... G06F 3/00; G06F 13/12; G06F 13/38
(52) U.S. Cl. ................................ 710/8; 710/9; 710/11; 710/62; 710/64; 710/104; 711/170; 713/1; 713/2; 713/100
(58) Field of Search ........................... 710/8, 9, 11, 62, 710/64, 104, 10, 33; 711/170; 713/1, 2, 100

(56) References Cited

U.S. PATENT DOCUMENTS

| 5,113,522 | A | * | 5/1992 | Dinwiddie et al. | ......... 709/400 |
| 5,748,980 | A | | 5/1998 | Lipe et al. | |
| 5,752,249 | A | * | 5/1998 | Macon et al. | ........... 707/103 R |
| 5,974,554 | A | | 10/1999 | Oh | |
| 6,059,842 | A | | 5/2000 | Dumarot et al. | |
| 6,141,712 | A | | 10/2000 | Sudhakaran et al. | |
| 6,161,150 | A | * | 12/2000 | Sudhakaran et al. | ........... 710/8 |
| 6,397,268 | B1 | * | 5/2002 | Cepulis | ........................ 710/8 |
| 6,496,893 | B1 | | 12/2002 | Arai | |
| 2003/0014468 | A1 | * | 1/2003 | Sudhakaran et al. | ........ 709/104 |

* cited by examiner

*Primary Examiner*—Jeffrey Gaffin
*Assistant Examiner*—Angel L. Casiano
(74) *Attorney, Agent, or Firm*—Meyertons Hood Kivlin Kowert & Goetzel, P.C.; B. Noël Kivlin

(57) ABSTRACT

A method of automatic configuration of field replaceable units in a system includes steps of accessing configuration management system (CMS) class information from a field replaceable unit (FRU) and using the accessed information for deriving an initial configuration for the FRU. The FRU can contain information defining one or more configuration management system classes for the FRU. One or more management classes may be identified for managing one or more resources for the FRU. The CMS class information is then be used to derive the initial configuration information for the FRU for managing the device(s) of that FRU. The CMS class information can be held in non-volatile memory in the FRU. This information can be read on inserting the FRU into the system and can be used to establish the initial configuration prior to full integration of the FRU into the system.

24 Claims, 14 Drawing Sheets

CONFIGURING SYSTEM UNITS USING ON-BOARD CLASS INFORMATION

This application is a continuation of International Application No. PCT/GB99/03334, filed Oct. 8, 1999, which claims the benefit of UK Patent Application No. 9822132.8 and UK Patent Application No. 9828200.7.

BACKGROUND OF THE INVENTION

The invention relates to the integration of a unit in an apparatus, for example, for configuring a field replaceable unit (FRU) into apparatus such as a computer system.

FRUs can be used in many different systems. They find particular but not exclusive application to computer systems, for example to fault tolerant computer systems where it is desirable to be able readily to replace units which have developed a fault or have been superseded by a more recent version.

Examples of FRUs for such a system can include, for example, a CPU, a PCI card, power supply units (PSUs), a motherboard, or any other system components. One FRU, for example a field replaceable card, can include hardware for implementing several devices (e.g. a multiple Ethernet adapter, or a SCSI adapter with an Ethernet adapter).

It is known to provide FRUs with non-volatile memory (e.g. EEPROMs), which can contain information relating to the FRU. In a known system, FRUs can include basic FRU identification information in the non-volatile memory.

It is also known to provide a system management suite, collectively known as a configuration management system (CMS) which manages the FRUs, other devices and system resources using objects to represent the FRUs, devices and other system resources. An object forms a particular instance of a CMS class, which is defined by a CMS definition (CMSDEF).

For example, a CAF (Console and Fans unit) CMSDEF defines the CAF CMS class of which the object CAF_1 is an instance that represents a particular CAF FRU. The CAF_1 object may have an attribute called LOCATION having the value A_CAF, indicating that the FRU represented by the CAF_1 object has been inserted into location A_CAF in the chassis of the computer system.

A problem when initiating a system is to establish an initial configuration for the system, by supplying initial values to object attributes which represent that configuration.

In the known system mentioned above, the CMS used a chassis type number read from the EEPROM of control-panel FRU to establish a default configuration for the system. However, this provided only a crude configuration for the system, as it relied in effect on 'fine-tuning' a pre-defined configuration to the specific needs of that type of system. Only 'standard' parts of the configuration (e.g. the boot disks and their controllers and the CPUs) could be established in this way so much of the more complex configuration (e.g. serial ports) had to be performed manually.

An object of the invention is to provide an improved method of providing automatic configuration of FRUs, and also a system implementing such a method, and FRUs for use in such a system.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a method of automatic configuration of a unit (e.g. a field replaceable unit (FRU)) of an apparatus. The method comprises steps of accessing class information held in the unit, using the accessed class information to identify means for deriving initial configuration information for the unit, and storing the configuration information in a configuration file for the system.

In an embodiment of the invention the access class information is used to identify system software that generates definition objections for the unit.

In accordance with another aspect of the invention, there is provided apparatus comprising a plurality of units that include unit storage for holding class information for the unit, a configuration mechanism for accessing class information from a unit and, in response thereto, for deriving initial configuration information for the unit; and system storage for the derived configuration information.

In accordance with a further aspect of the invention, there is provided a configuration management system for such an apparatus, the configuration management system comprising an initialization component configured to access class information held in a unit of the apparatus and to use the accessed class information for deriving an initial configuration for the unit.

In accordance with yet a further aspect of the invention, there is provided a field replaceable unit for such an apparatus, which field replaceable unit comprises storage containing configuration class information for deriving object class definitions for the field replaceable unit. The class information held in a FRU effectively provides a pointer to configuration information for the class of the FRU. The configuration information (in the preferred implementation configuration code) can relate to any desired property, feature, characteristic, operation, etc., of that class of FRU.

By initially accessing the class information for the unit, and deriving initial configuration information (configuration statements) from class information prior to functional integration of the unit, rapid and reliable integration of the unit can be achieved.

The class information can be held in non-volatile memory (e.g., in an EEPROM) in the unit. This information can be read on inserting the unit into the system and can be used to establish the initial configuration prior to full integration of the unit into the system.

In an embodiment of the invention, a unit contains information defining one or more configuration management system (CMS) classes for a FRU. A management class is identified for managing the FRU.

Verification of the derived configuration information can be employed to check on the operability and compatability of the unit to other units in the system prior to integration thereof.

More detailed information regarding the unit, for example relating to the configuration of devices in the unit, can be effected in a second stage. For example, in an embodiment of the invention, a FRU contains information defining a configuration management system (CMS) class for the unit. The unit can include one or more devices (resources), and each device can be associated with its own CMS class as well. The CMS class information for the unit can be accessed and used to derive the initial configuration information for the unit. The class information for the devices can then be accessed and used for further configuring those devices.

The CMS class information stored in the unit can be in the form of a name for the class of unit, which is used to identify or point to configuration code for configuring that class of unit. The configuration code can form part of the object definitions (CMS definitions) which are held outside the units, for example in computer system memory, on a disk, or at a remote site via a telecommunication interface. The CMS class information effectively performs the function of providing a handle for accessing the means for generating the initial configuration.

Holding the configuration code and the definitions for the units outside those units provides for a flexible configuration of the units. For example, an Ethernet card might typically include information such as its MAC address preconfigured into it. With an embodiment of the invention, this information can instead be held as part of the CMS definition for a class and instance of the unit, so that when a card is replaced, the card can be configured in a reliable and repeatable manner using a standard definition. By storing configuration information as part of the CMSDEFs when a card is initially installed, subsequent configuration when the card is replaced is facilitated, the information needed for this thus being already held in the system. This is particularly important in a fault tolerant system, where continuity is required across hardware failures and replacement and repair. Thus, an embodiment of the invention can facilitate fault tolerance management and thereby facilitate the management of hot-swappable FRUs.

In one embodiment, the CMS class information from a unit identifies one of a number of possible configuration management system (CMS) definitions (CMSDEFs) which can be used to control the management of that class of unit. A CMS definition includes declarations, attributes (including relationships with other objects), state evaluations (statements for evaluating the states of objects), and transition code which is executed when a transition occurs between the states of an object. Optionally associated with a CMSDEF is an initialization script forming the configuration code. This configuration code can emit configuration statements for the object. This script can be permitted to interrogate the non-volatile memory in the unit (e.g., a FRU) for further information (e.g. device properties such as MAC address) and receives as arguments the class for the unit and an instance of the unit. The instance number is generated by an initialization component of the configuration management system (CMS) (which can be in the form of a program called CMSINITIALIZE).

To establish the initial configuration, the initialization component probes each location in the computer system chassis, and when the location is occupied by a unit with storage for a class information, the class information for that unit is read.

The initialization component derives a pathname for the initialization script from the CMS management class name for the unit as stored therein. If the initialization script is present, it is executed, with the class name and the instance number (i.e. an integer per class, starting at zero, and incremented by one each time that class initialization script is invoked), and the location of the unit, as arguments.

The output from the script, which is in the form of a set of object configuration data for the respective units (FRUs), is collected by the initialization component and is 1stored in a configuration file. On subsequent invocations of the system, this configuration file can be used as the source of the configuration information.

A configuration management system daemon (CMSD) can be configured to be sensitive to bad configuration data. Accordingly, the object configuration data for each object (FRU device) is passed to the CMSD. The CMSD is operated in a test mode to verify the object configuration data. The initialization component only saves the object configuration data for a particular unit if it is acceptable to the CMSD.

As an alternative to providing CMS class information in the form of a reference (e.g., name or a pointer) for identifying CMSDEFs and initialization scripts which are not held in the unit to be integrated, the storage could contain the CMSDEF and initialization scripts directly. However, this would of course require more storage in the FRU for this information, rather than reference to the information. It would also reduce the overall flexibility of the system.

The initialization script could be arranged to access the FRU non-volatile memory for further information such as a MAC address and other FRU specific information, required for configuration.

The configuration management system can be in the form of one or more computer programs comprising computer code, or instructions, defining the functionality of the configuration management system.

Accordingly, an aspect of the invention also provides a carrier medium carrying at least an initialization component of a configuration management system. The initialization is component configured to access class information held in a unit of the apparatus and to use the accessed class information for deriving an initial configuration for the unit.

The carrier medium can be any form of carrier medium for carrying computer program code, whether that be a magnetic, optical or any other form of data storage such as a tape, disk, solid state, or other form of storage providing random or read-only or any other form of access, or a transmission medium such as a telephone wire, radio waves, etc.

The operations indicated above are effected on initiation of the system. However, they could optionally be also effected during running of the system for changing a configuration.

The storage in the unit can contain much more information in each volatile memory than that described above.

For example, it can additionally be used to store certain status information relating to the system operation, in order that the state of the system can be consistent across restarts.

Also it can be used to store a history for the unit. This information could then be used off-line at some later stage, (for example on return of an allegedly faulty FRU) to establish whether it is the FRU or, perhaps, a slot in which it has been inserted, which is faulty.

Although the invention finds particular application to a configuration management system responsive to configuration management system definitions, the invention could also be applied to other forms of system and network management. For example, in a Telecommunications Management Network (TMN) environment, the memory of a unit could contain (either directly, or via a reference to a disk file) the GDMO definitions of the unit and its devices, and these could be passed to a local agent and a remote manager to allow the unit to be managed.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
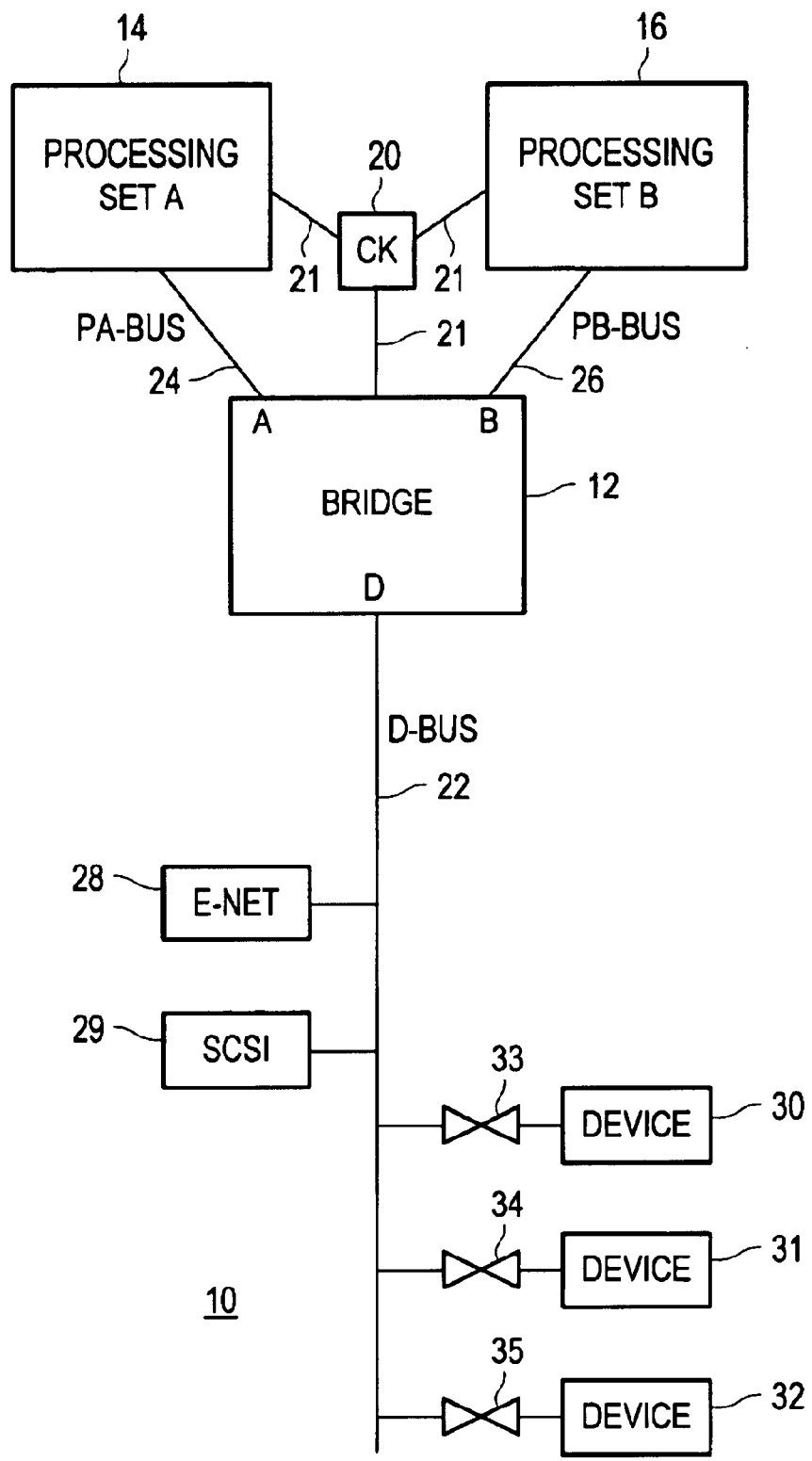
FIG. 1 is a schematic overview of a fault tolerant computer system incorporating an embodiment of the invention.

FIG. 1 is a schematic overview of a fault tolerant computing system 10 comprising a plurality of CPUsets (processing sets) 14 and 16 and a bridge 12. As shown in FIG. 1, there are two processing sets 14 and 16, although in other embodiments there may be three or more processing sets. The bridge 12 forms an interface between the processing sets and I/O devices such as devices 28, 29, 30, 31 and 32. In this document, the term "processing set" is used to denote a group of one or more processors, possibly including memory, which output and receive common outputs and inputs. It should be noted that the alternative term mentioned above, "CPUset", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, in the present instance a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in the present instance also a PCI bus.

Although in the particular example described, the buses 22, 24 and 26 are all PCI buses, this is merely by way of example, and in other embodiments other bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other I/O devices such as I/O devices 30, 31 and 32 can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices which are active are switched on, reducing the effective total bus length. It will be appreciated that the number of I/O devices which may be connected to the D bus 22, and the number of slots provided for them, can be adjusted according to a particular implementation in accordance with specific design requirements.

Figure 2:
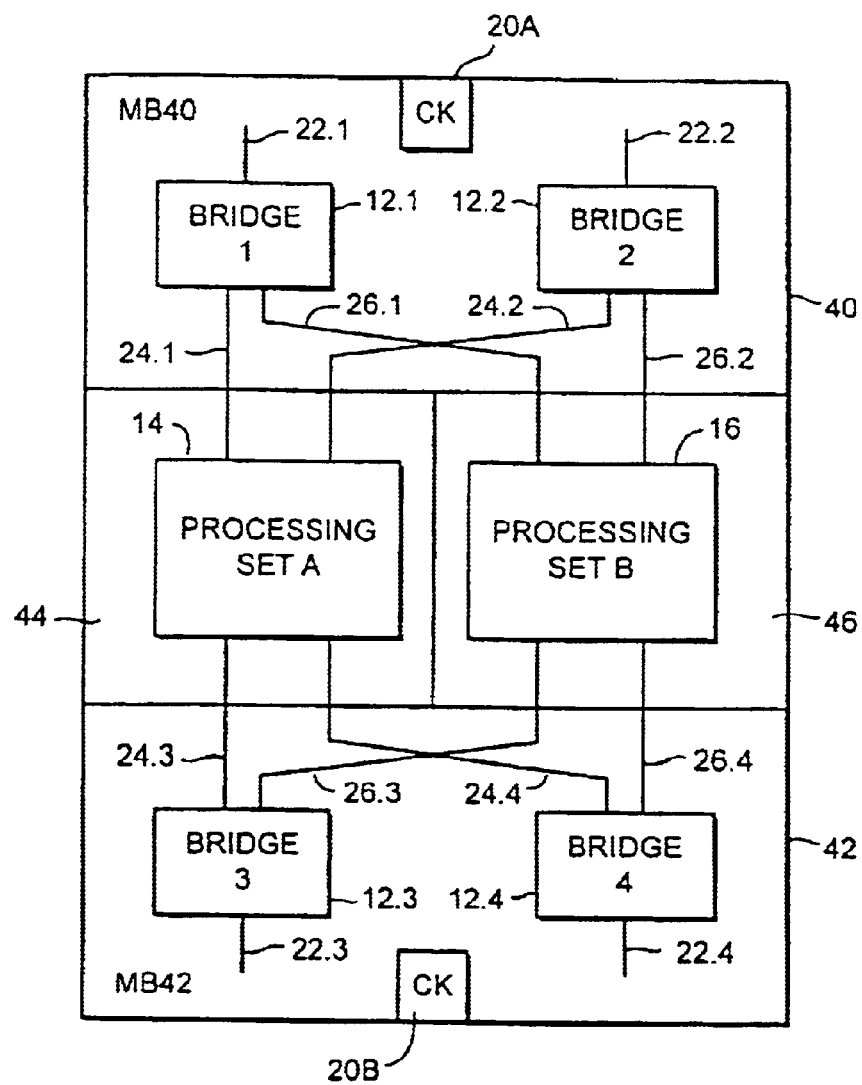
FIG. 2 is a schematic overview of a specific implementation of a system based on that of FIG. 1.

FIG. 2 is a schematic overview of a particular implementation of a fault tolerant computer employing a bridge structure of the type illustrated in FIG. 1. In FIG. 2, the fault tolerant computer system includes a plurality (here four) of bridges 12 on first and second I/O motherboards (MB 40 and MB 42) order to increase the number of I/O devices which may be connected and also to improve reliability and redundancy. Thus, in the embodiment shown in FIG. 2, two processing sets 14 and 16 are each provided on a respective processing set board 44 and 46, with the processing set boards 44 and 46 'bridging' the I/O motherboards MB 40 and MB 42. A first, master clock source 20A is mounted on the first motherboard 40 and a second, slave clock source 20B is mounted on the second motherboard 42. Clock signals are supplied to the processing set boards 44 and 46 via respective connections (not shown in FIG. 2).

First and second bridges 12.1 and 12.2 are mounted on the first I/O motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an I/O databus (D bus) 22.1 and the bridge 12.2 is connected to an I/O databus (D bus) 22.2.

Third and fourth bridges 12.3 and 12.4 are mounted on the second I/O motherboard 42. The bridge 12.3 is connected to the processing sets 14 and 16 by P buses 24.3 and 26.3, respectively. Similarly, the bridge 4 is connected to the processing sets 14 and 16 by P buses 24.4 and 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
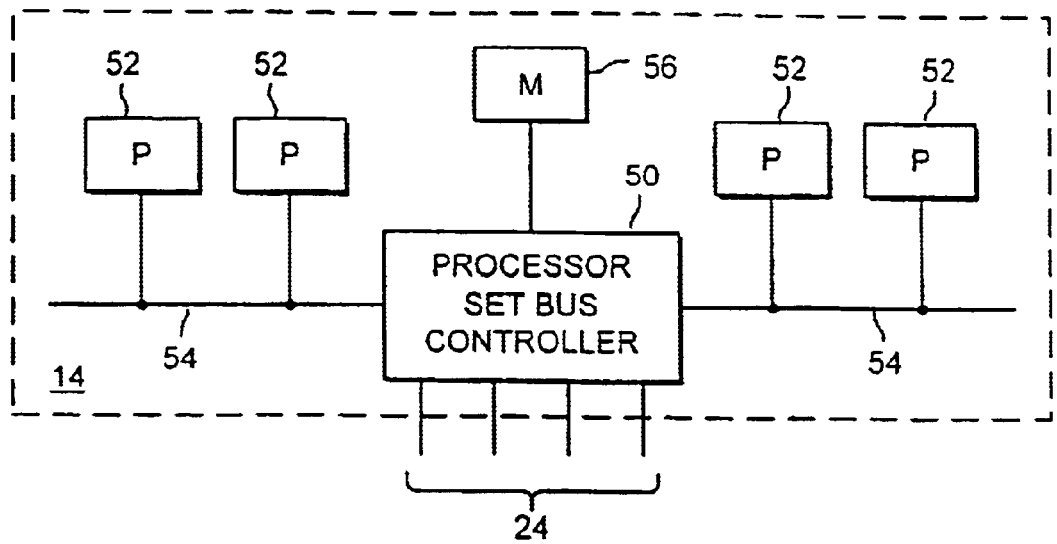
FIGS. 3 and 4 are schematic diagrams of examples of processing sets.

FIG. 3 is a schematic overview of one possible configuration of a processing set, such as the processing set 14 of FIG. 1. The processing set 16 could have the same configuration. In FIG. 3, a plurality of processors (here four) 52 are connected by one or more buses 54 to a processing set bus controller 50. As shown in FIG. 3, one or more processing set output buses 24 are connected to the processing set bus controller 50, each processing set output bus 24 being connected to a respective bridge 12. For example, in the arrangement of FIG. 1, only one processing set I/O bus (P bus) 24 would be provided, whereas in the arrangement of FIG. 2, four such processing set I/O buses (P buses) 24 would be provided. In the processing set 14 shown in FIG. 3, individual processors operate using the common memory 56, and receive inputs and provide outputs on the common P bus(es) 24.

Figure 4:
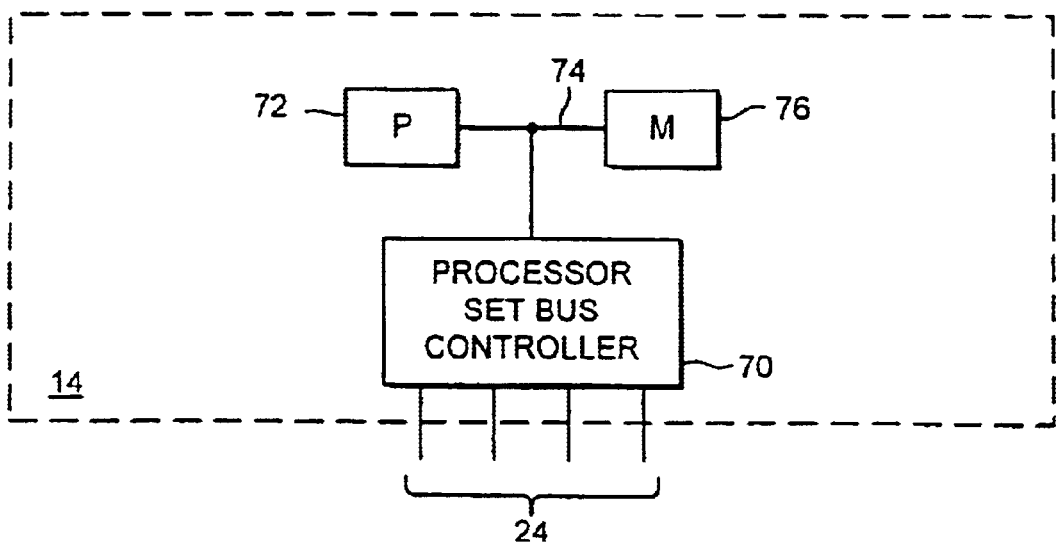

FIG. 4 illustrates an alternative configuration of a processing set, such as the processing set 14 of FIG. 1. Here a simple processing set includes a single processor 72 and associated memory 76 connected via a common bus 74 to a processing set bus controller 70. The processing set bus controller 70 provides an interface between the internal bus 74 and the processing set I/O bus(es) (P bus(es)) 24 for connection to the bridge(s) 12.

Accordingly, it will be appreciated from FIGS. 3 and 4 that the processing set may have many different forms and that the particular choice of a particular processing set structure can be made on the basis of the processing requirement of a particular application and the degree of redundancy required. In the following description, it is assumed that the processing sets 14 and 16 referred to have a structure as shown in FIG. 3, although it will be appreciated that another form of processing set could be provided.

The bridge(s) 12 are operable in a number of operating modes. In a first, combined mode, a bridge 12 is operable to route addresses and data between the processing sets 14 and 16 (via the PA and PB buses 24 and 26, respectively) and the devices (via the D bus 22). In this combined mode, I/O cycles generated by the processing sets 14 and 16 are compared to ensure that both processing sets are operating correctly. Comparison failures force the bridge 12 into an error limiting mode (EState) in which device I/O is prevented and diagnostic information is collected. In a second, split mode, the bridge 12 routes and arbitrates addresses and data from one of the processing sets 14 and 16 onto the D bus 22 and/or onto the other one of the processing sets 16 and 14, respectively. In this mode of operation, the processing sets 14 and 16 are not synchronized and no I/O comparisons are made. DMA operations are also permitted in both modes.

Figure 5:
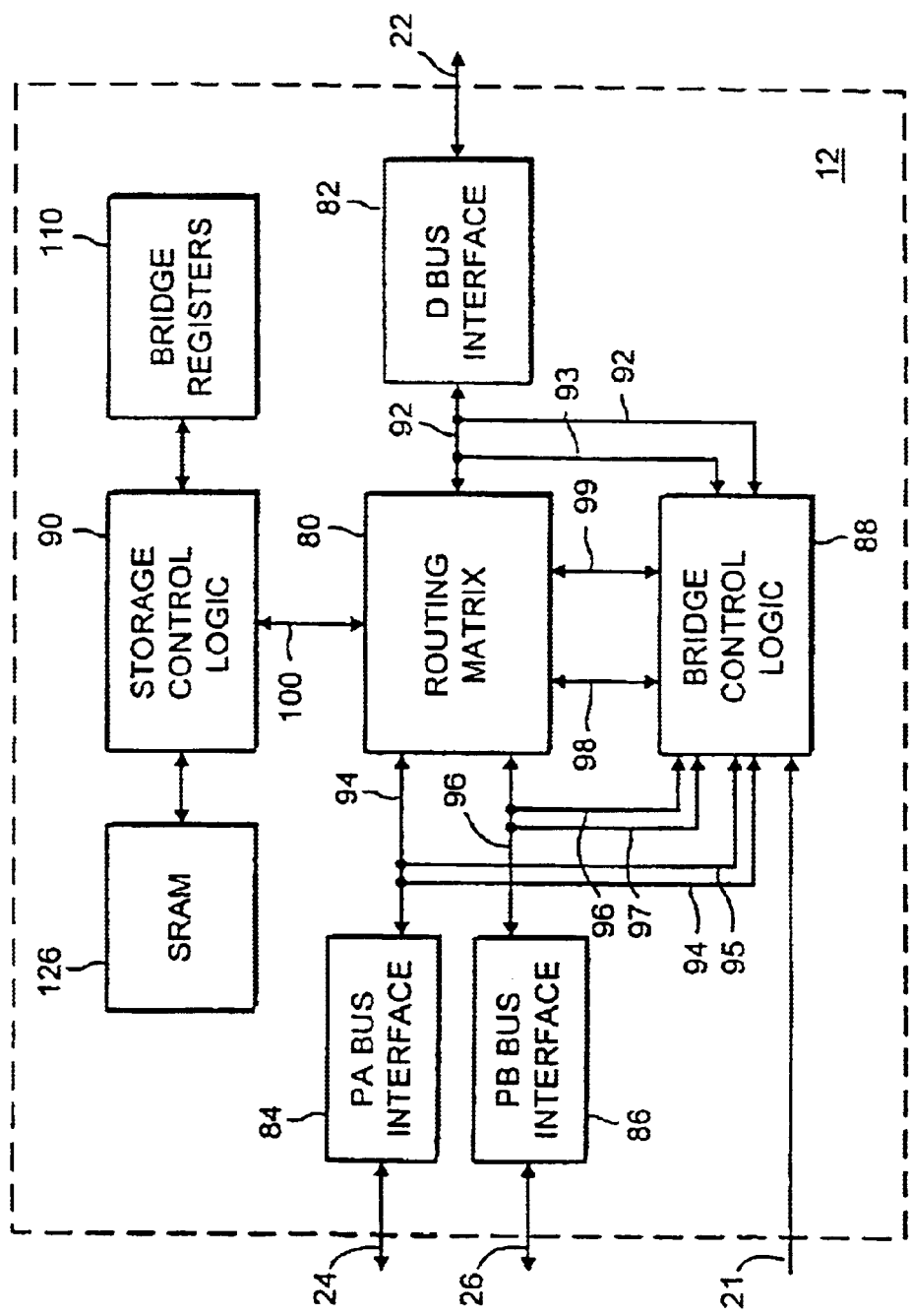
FIG. 5 is a schematic block diagram of an embodiment of a bridge for the system of FIG. 1.

FIG. 5 is a schematic functional overview of the bridge 12 of FIG. 1. First and second processing set I/O bus interfaces, PA bus interface 84 and PB bus interface 86, are connected to the PA and PB buses 24 and 26, respectively. A device I/O bus interface, D bus interface 82, is connected to the D bus 22. It should be noted that the PA, PB and D bus interfaces need not be configured as separate elements but could be incorporated in other elements of the bridge. Accordingly, within the context of this document, where a reference is made to a bus interface, this does not require the presence of a specific separate component, but rather the capability of the bridge to connect to the bus concerned, for example by means of physical or logical bridge connections for the lines of the buses concerned.

Routing (hereinafter termed a routing matrix) 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the embodiment of the invention, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystem 90 of the bridge on transition to an EState or on detection of an I/O error.

Figure 6:
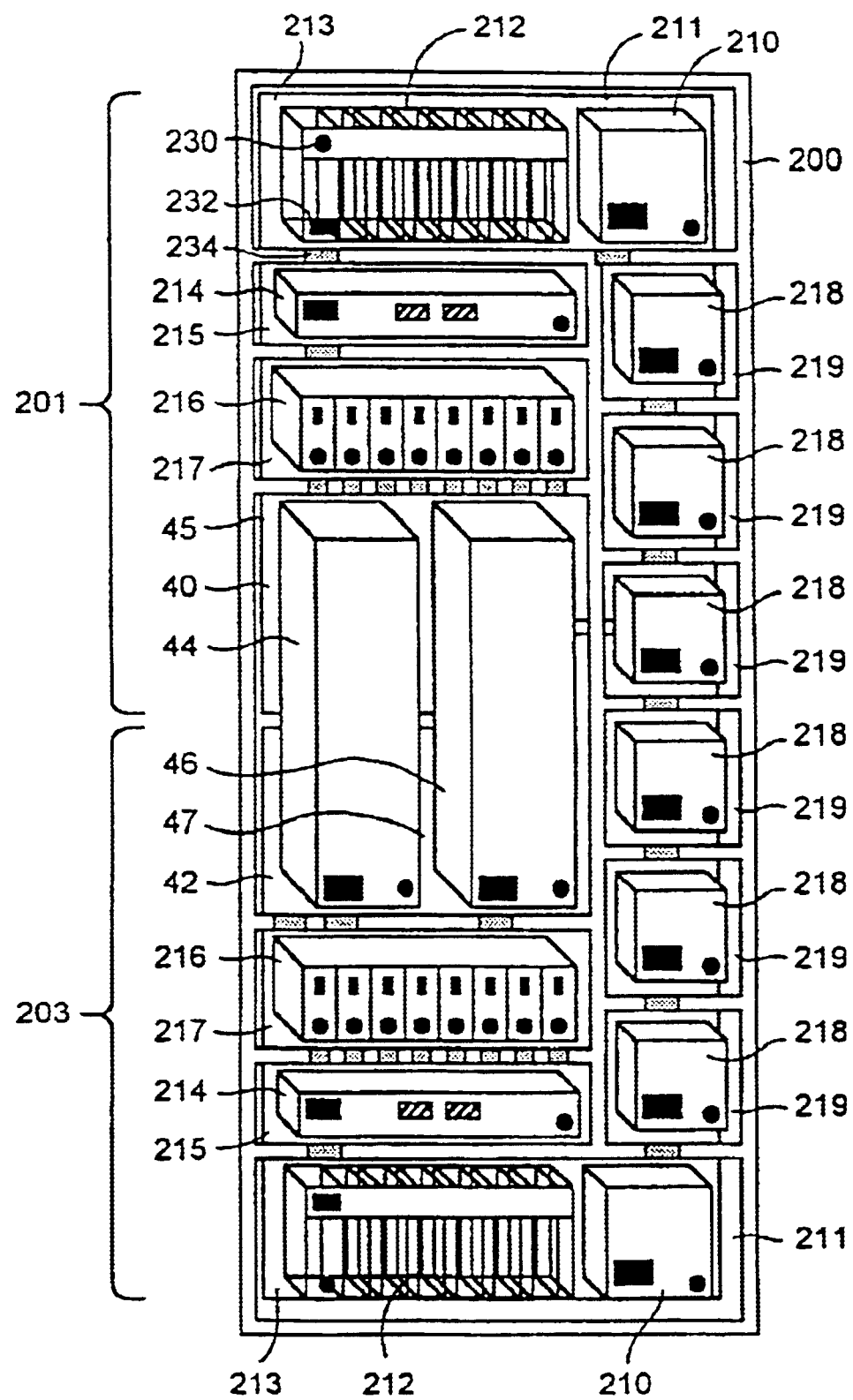
FIG. 6 is a schematic representation of a physical configuration of a computer system chassis with field replaceable units locatable in respective slots.

FIG. 6 is a schematic overview of a chassis 200 with the various slots for receiving field replaceable units (FRUS) including components, or devices, of the fault tolerant computing system 10 described with reference to FIGS. 1 to 5. Each FRU may contain one or more devices.

Examples of the field replaceable units for use in the system include the two motherboards 40 and 42. These are mounted at locations 201 and 203 in the upper and lower portions of the chassis 200 as viewed in FIG. 6. The first and second processor sets 44 and 46, which also form FRUs, are mounted at locations 45 and 47 bridging the motherboards 40 and 42.

Other field replaceable units illustrated in FIG. 6 are Removable Media Module (RMM) FRUs 210, which are mounted in slots 211. Disk drive chassis FRUs 212 are mounted in slots 213. The disk drives in the disk drive chassis 212 are typically configured as FRUs. Console and Fan (CAF) FRUs 214, which include switches, ports, alarms and LEDs, are mounted in slots 215. PCI frame FRUs 216 are mounted in slots 217. The PCI cards in the PCI frame are also configured as FRUs. Power supply FRUs 218 are mounted in further slots 219. Sub-assemblies (not shown) of the power supply FRUs 218 could also be provided and be configured as FRUs.

The FRUs for insertion in the various slots are provided with an identification label (e.g., DSK) 232. A corresponding label (e.g., A-DSK) 234 is associated with each slot to indicate to the operator where each FRU is to be located. In an embodiment of the invention a FRU comprises a memory 230 (e.g., a non-volatile memory such as an EEPROM) for containing information relating to the FRU and the device(s) it carries. As will be described later, this information includes configuration management system class information for the FRU for use by a configuration management system (CMS) 400 (not shown in FIG. 6) to configure the FRU within the system. It should be noted that an embodiment of the invention may include, in addition to FRUs that include a memory 230, some units that are replaceable in the field, for example a disk drive, but which might not be provided with a memory 230. This may be desirable where, for reasons of economy, a conventional field replaceable unit is used.

Figure 7:
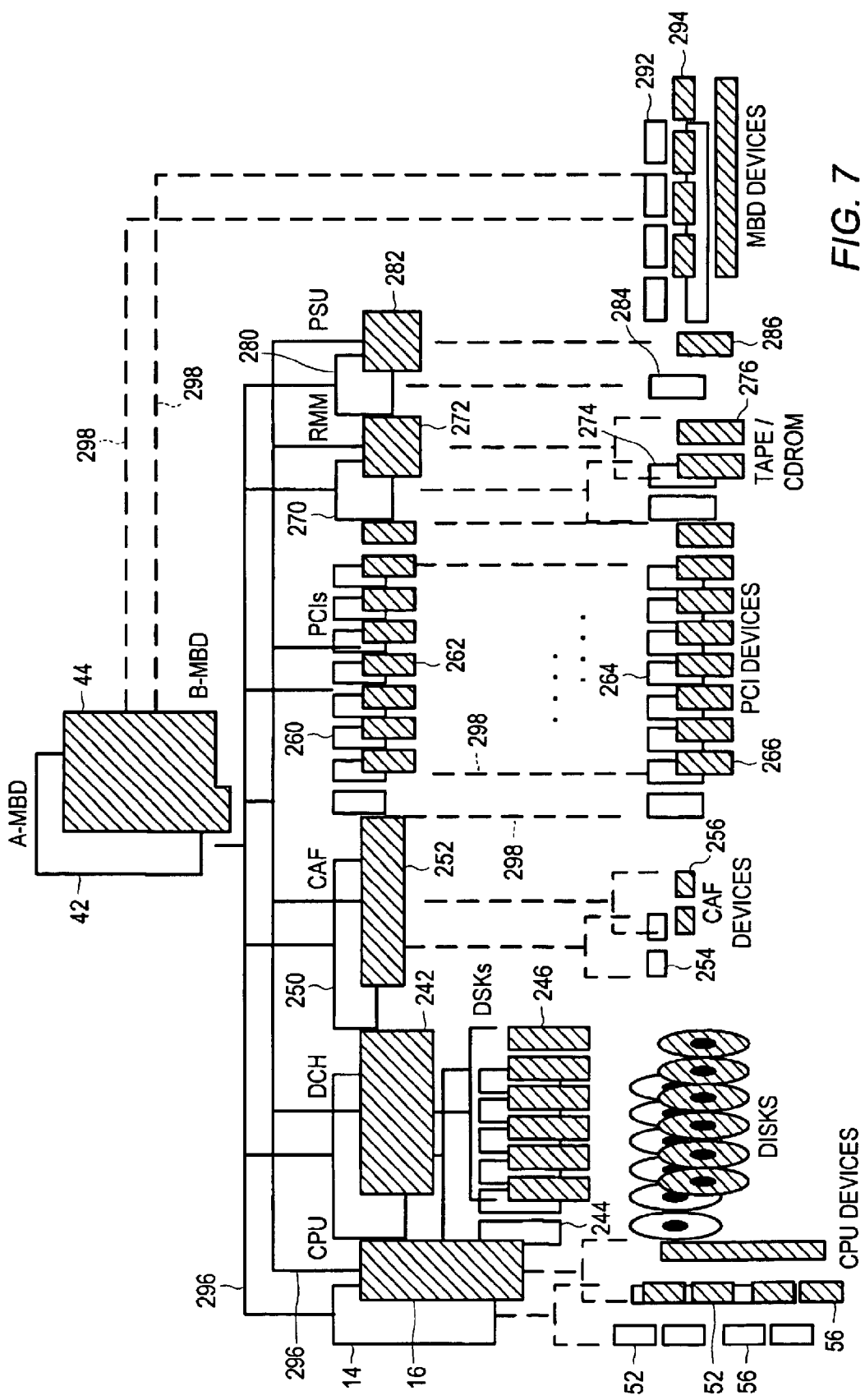
FIG. 7 is a schematic representation of configuration management system representation of the physical configuration of FIG. 7.

FIG. 7 is the schematic representation of the manner in which the CMS models the physical structure of the system.

The CMS does not model the system chassis. The CMS does, however, model the FRUs and the devices therein. The CMS models a containment hierarchy of the FRUs. The model shows the physical dependency of the respective elements. The model indicates the dependency of the FRUs on one of the motherboards. It does not show the dependency of the motherboards on the power supply units. The dependency of the system on the processing sets is shown by the service hierarchy for the processor set sub-system.

As shown in FIG. 7, the CMS models the processing set 14 with the associated processing set devices 52, 56, etc. (see FIGS. 3–5) as dependent on the first motherboard 42. Also modelled as dependent on the first motherboard 42 is a first disk chassis 240 with associated disk drives 244. CAF FRUs 250 with associated CAF devices 254 are also modelled as being dependent on the first motherboard 42, as are PCI adapters 260 and the associated PCI devices 264. A removable media FRU (RMM) 270 and associated media devices (e.g., including tape and CD ROM drives) 274 are further modelled as dependent upon the first motherboard 42, as are the power supply units 280 (possibly also with power supply sub-systems 284). The various motherboard devices 292 of the first motherboard 42 are also modelled by the CMS.

The CMS models the processing set 16 with the associated processing set devices 52, 56, etc. (see FIGS. 3–5) as dependent on the second motherboard 44. Also modelled as dependent on the second motherboard 44 is a second disk chassis 242 with associated disk drives 246. CAF FRUs 252 with associated CAF devices 256 are also modelled as being dependent on the second motherboard 44, as are PCI adapters 262 and the associated PCI devices 266. A removable media FRU (RMM) 272 and associated media devices (e.g., including tape and CD ROM drives) 276 are further modelled as dependent upon the second motherboard 44, as are the power supply units 282 (possibly also with power supply sub-systems 286). The various motherboard devices 294 of the first motherboard 44 are also modelled by the CMS.

In FIG. 7, the solid lines (e.g., 296) illustrate the dependencies of the FRU constituents on the motherboards 42 and 44 (it being remembered that the motherboards are also FRUs). The dashed lines (e.g., 298) illustrate the dependencies of the device constituents on the FRU constituents.

Figure 8:
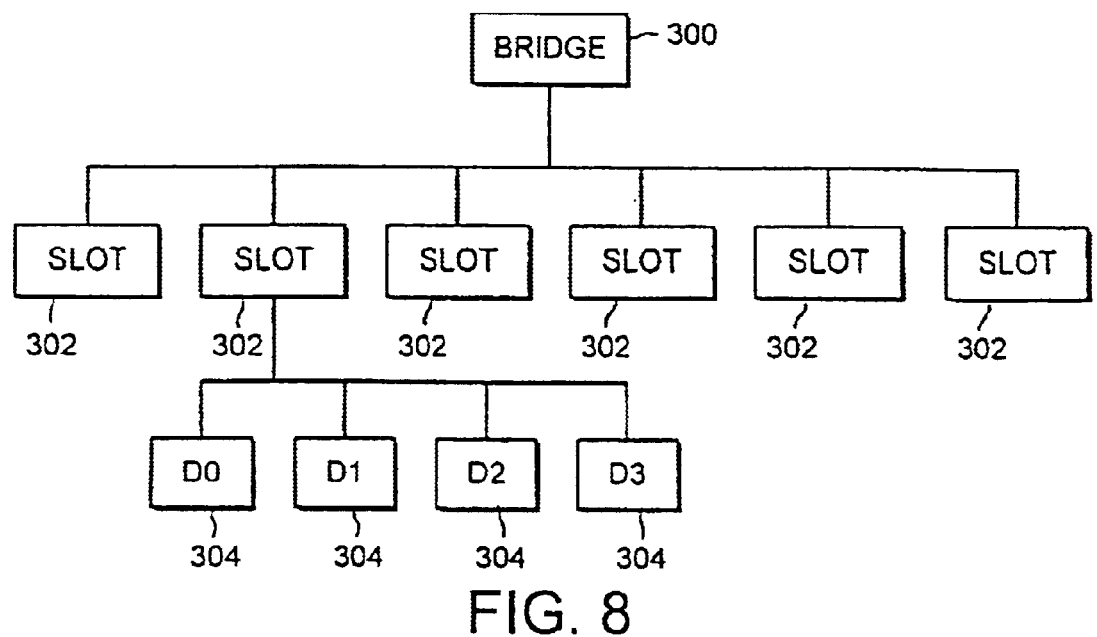
FIG. 8 is a device hierarchy model and FIG. 9 is a service hierarchy model.

FIG. 8 is a schematic representation of the modeling of a device hierarchy by the CMS. The device hierarchy is independent of the FRU hierarchy described with reference to FIG. 7 and is independent of the physical arrangement of the FRUs as different devices can be on different FRUs. The CMS creates this device hierarchy from the class information, and possibly other information, read from non-volatile memory on the FRUs.

The CMS models parts of some of the device tree, with the various elements being shown as nodes, or objects in the tree. Thus, a first node, or object, 300 representing the bridge is linked to individual nodes, or objects 302 representing slot controllers. Similarly, individual devices, such as devices D0, D1, D2 and D3 represented by nodes, or objects 304, are linked to a slot object 302. The CMS is able to use this tree to communicate with individual device drivers, and allows the CMS to model dependencies between the devices.

Figure 9:
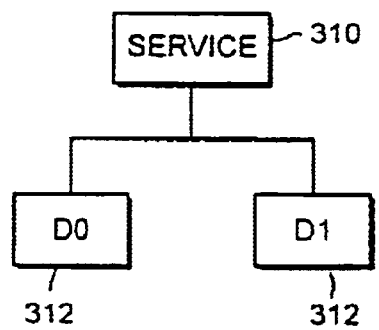

FIG. 9 illustrates a service hierarchy. Service hierarchies can be defined with a service 310 being represented as a node or object within the service hierarchy. A service can define, for example, a sub-system such as a fault tolerant core service. The services define system availability and are dependent on the devices of the system. Devices are also defined in the service hierarchy by nodes, or objects 312 in the service hierarchy. As shown in FIG. 9, dependencies between individual devices 312 such as devices D0 and D1 and the service 310 are represented. The service hierarchy could be derived automatically, but may also be derived manually.

The combination of the hierarchies shown in FIGS. 7, 8 and 9 form the configuration management system (CMS) model which is used to control the operation of the system. The model can be stored in the form of a database in a configuration file. The CMS uses this model to be able to support fault tolerance at a high level. It allows users to configure the various components of the system to carry out desired functions, and to oversee the functioning of the system.

Figure 10:
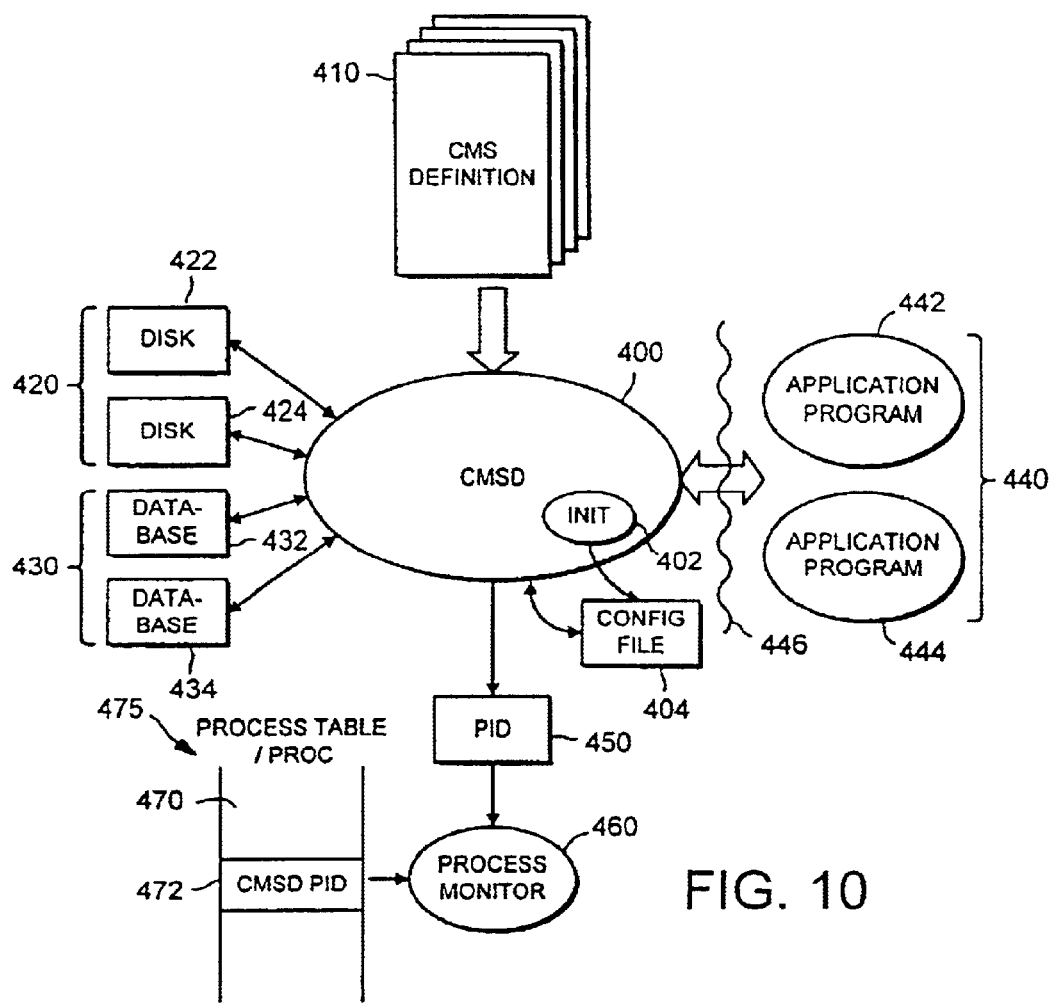
FIG. 10 illustrates the relationships between a configuration management system daemon and further components of the computer system.

FIG. 10 illustrates the relationship between a configuration management system daemon CMSD 400 and various components of the system. The CMSD 400 is a daemon for implementing the control management system of the computer system illustrated in the earlier figures. A daemon is a background management process. Such a process may be available at any time from system initiation until shutdown.

The CMSD 400 manages various system entities (objects) which can be physical devices and/or software entities. The CMSD 400 is connected via a UNIX socket forming an application program interface (API) 446 to one or more application programs 440. In the present instance two application programs 442 and 444 are shown.

The behavior of the CMSD 400 is specified using CMS definitions (CMSDEFs) 410. The CMSDEFs include declarations for objects that are managed by the CMSD 400, state evaluations (statements for evaluating the states of objects), and transition code that is executed when a transition occurs between the states of an object. The CMSDEFs 410 can be thought of as being similar to a set of state machines for the objects managed by the CMSD 400, with the CMSD 400 executing the state machines.

An initialization component 402 of the CMS is operative on a first initialization of the CMS to create a model of the system as described with reference to FIGS. 7, 8 and 9 and stores this in a configuration file 404. The configuration file 404 forms a persistent copy of the model which can be used by the current invocation of the CMSD and on a subsequent re-boot or re-initialization of the system, assuming that the configuration has not changed or the configuration file has not been lost or damaged. The storage of the model in such a persistent manner can save initialization time as it is not necessary to go through the process of re-creating the model. It can also provide consistency between system initializations. As a result, in a fault tolerant system, it can enable better detection of faults where system elements have failed or changed between system initializations.

The CMSD 400 is operationally connected to various system entities that are managed by the CMSD 400. These entities can include physical devices 420 (for example disk drives 422 and 424) or software entities (for example databases 432 and 434). As will be described hereinafter, the CMSD 400 is associated with a unique processor identification (PID) 450, which the CMSD stores in a storage location, or file 452, known to a monitor process when the CMSD initiates successfully. The operation of the CMSD 400 is monitored by a process monitor 460 using the PID 450 stored by the CMSD 400 in the file 452. The process monitor 460 is configured as a monitor process (program) operable on the computer system. The monitor process 460 and the CMSD 400 are stored in the system memory of the processing sets and are executed by the processor(s) of the processing sets of the system. The file for the PID 450 can also be held in a system register or in memory.

The process monitor 460 is able to access the file 452 in order to determine the unique PID 450 for the CMSD 400. PID 450 is truly unique to the actual invocation of the CMSD 400, and is not to be confused with a simple name which could be associated with various versions of the CMSD 400, or even with another process or program masquerading as the CMSD 400. The process monitor 460 then uses the PID 450 from the file 452 to access status information identified by the PID 450 (at 472) in a process table (/proc) 470. The process table 470 can be held in a system register or in memory. The process table forms part of the resources of the operating system 475 of the computer system. The status information at location 472 in the process table 470 defines the current status of the CMSD 400, and, in particular, indicates whether it is currently active, and healthy, or whether it has died.

The CMSD 400 is normally started in the same way as any system daemon by a system process at system start-up. Following this, the process monitor 460 is then started. The process monitor is then able to monitor the CMSD 400 for failure of the CMSD 400. If the process monitor 460 detects failure of the CMSD 400, it initiates a restart of the CMSD 400.

Figure 11:
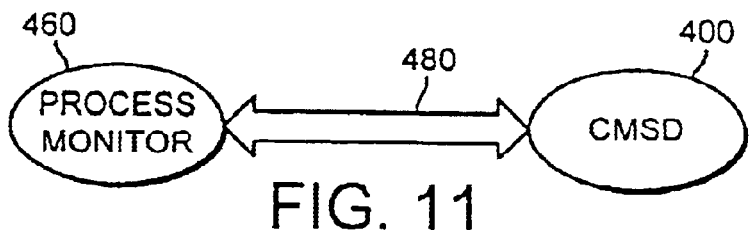
FIGS. 11, 12 and 13 represent various stages in initiating a configuration system daemon.
Figure 12:
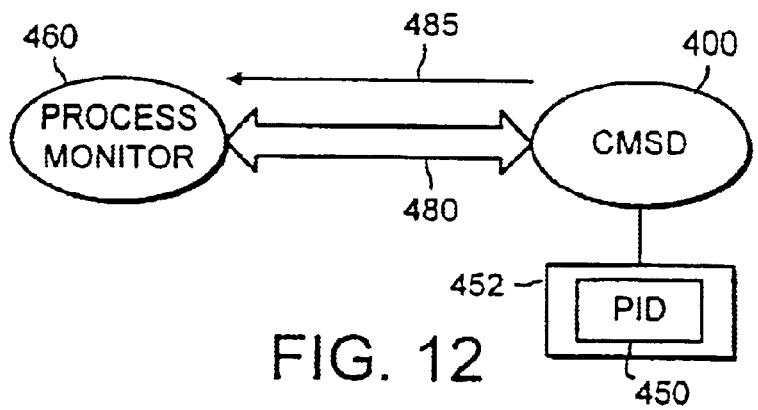
Figure 13:
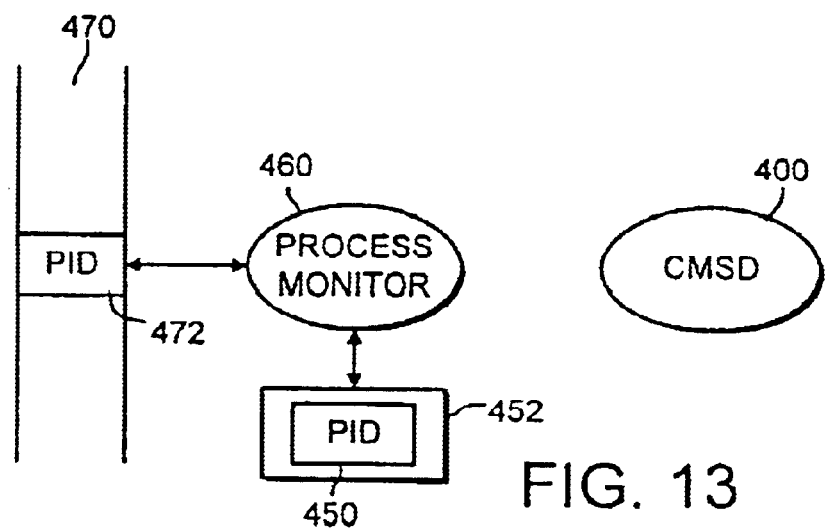

FIGS. 11–13 illustrate various steps for restarting the CMSD 400.

In a first step, illustrated in FIG. 11, following the detection of CMSD failure, the process monitor 460 starts the CMSD 400, which then proceeds to check that it is operable (i.e. is able to execute or function successfully). This can involve checking that the various data on which it relies is available and can be assembled into a database (if this has not already been done). The new CMSD is critical of its own operation at this stage and will indicate a fault if any inconsistencies or omissions are detected. At this step in the process, a handshaking exchange 480 occurs between the CMSD 400 and the process monitor 460 in order to test whether or not the CMSD 400 will execute successfully.

FIG. 12 illustrates a second step in the initialization of the CMSD 400. This step is reached where the CMSD determines that it is operable. The CMSD 400 then writes its unique process identification (PID) 450 to the predetermined location, or file 452 and also informs (at 485) the process monitor 460 that it is operable. The predetermined location, or file, 452 is a storage location, or file, known to the process monitor 460.

FIG. 13 illustrates the operational state of the process monitor 460 and the CMSD 400 following initialization of the CMSD 400. The process monitor 460 is operable to access to the PID 450 in the file 452 and to use the PID 450 from the file 452 to access the process status information 472 identified by the CMSD PID in the process table 470 of the system operating system.

As described above, the CMSD 400 is started by a standard system start-up process prior to starting the process monitor 460. However, it would be possible to start the process monitor first and then to allow the process monitor 460 to discover the lack of a CMSD and to start the CMSD as described above with reference to FIGS. 11 to 13.

Figure 14:
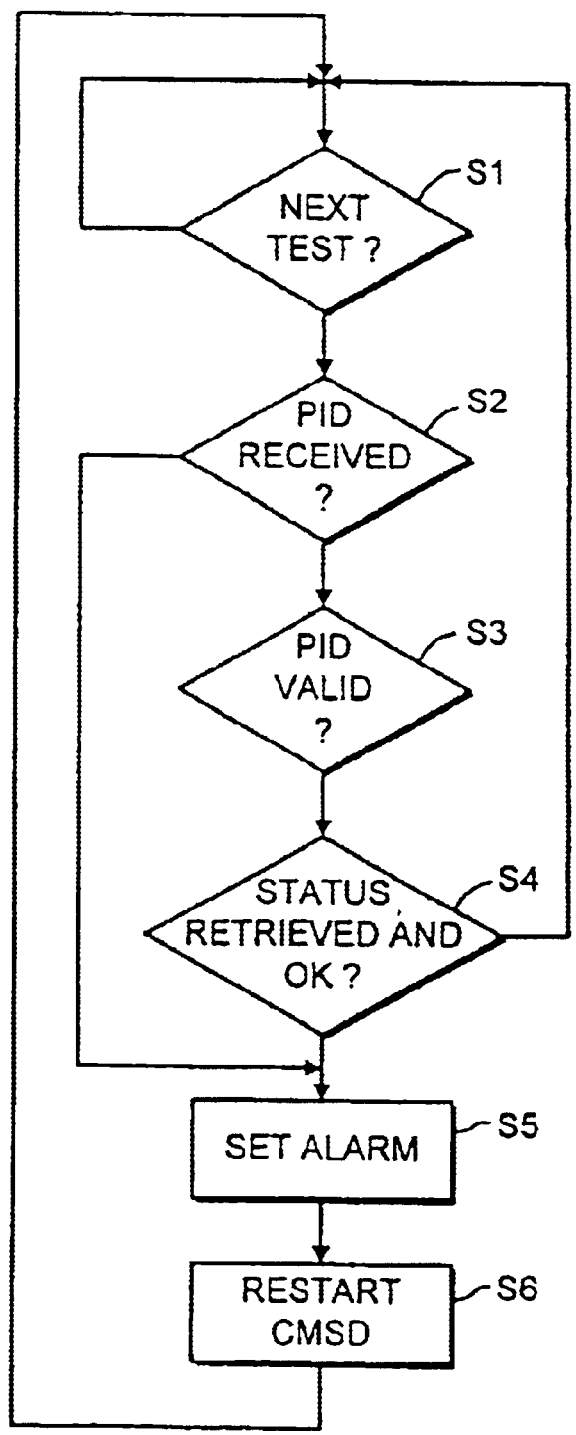
FIG. 14 is a flow diagram illustrating the operation of a process monitor.

FIG. 14 illustrates the operation of the process monitor 460 for verifying the correct operation of the CMSD 400.

The process monitor 460 is operable at predetermined times (as represented by step S1) to test the current status of the CMSD 400. This test could be performed after a predetermined interval and/or after specified system events have occurred.

In step S2 the monitor process 460 attempts to retrieve the PID 450 for the CMSD 400 from the predetermined file location 452. If the monitored process 400 is unable to retrieve the PID 450 for any reason, an alarm A is asserted in step S5 and an attempt is made to restart the CMSD 400 in step S6.

If the PID 450 is retrieved from the location 452, the validity of the PID 450 is tested in step S3. If the validity test on the PID is negative, the alarm A is asserted in step S5 and an attempt is made to restart the CMSD 400 in step S6.

If the validity test on the PID 450 is positive, the process monitor 460 then proceeds to use the PID 450 in step S4 to test the status of the CMSD 400 by accessing status information for the CMSD 400 at a location 472, identified by the PID 450 in the operating system process table 470.

The process monitor 460 is able to recognize various states for the CMSD 400. These include the states:

| | |
|---|---|
| CMSD_ok | CMSD is running correctly |
| CMSD_unknown | CMSD status cannot be determined |
| CMSD_dead | CMSD has died |
| CMSD_slow | CMSD appears to be alive but not responding |
| System_error | There is some system error affecting CMSD tests |
| CMSD_restart | There has been a restart error |

When the process monitor 460 identifies that the CMSD is running correctly, control passes from step S4 back to step S1, where the process monitor 460 waits until the next test on the operation of the CMSD 400 is to be performed.

Where the process monitor 460 identifies in step S4 that the CMSD appears to be dead, an alarm A is asserted in step S5 and an attempt is made to restart the CMSD 400 in step S6. Optionally, the process monitor 460 can be operable to set an alarm and send a warning message in step S5. The process monitor 460 is then operable to attempt, in step S6, to restart the CMSD 400 where the CMSD status is identified as being anything other than that the CMSD 400 appears to be running correctly.

Figure 15:
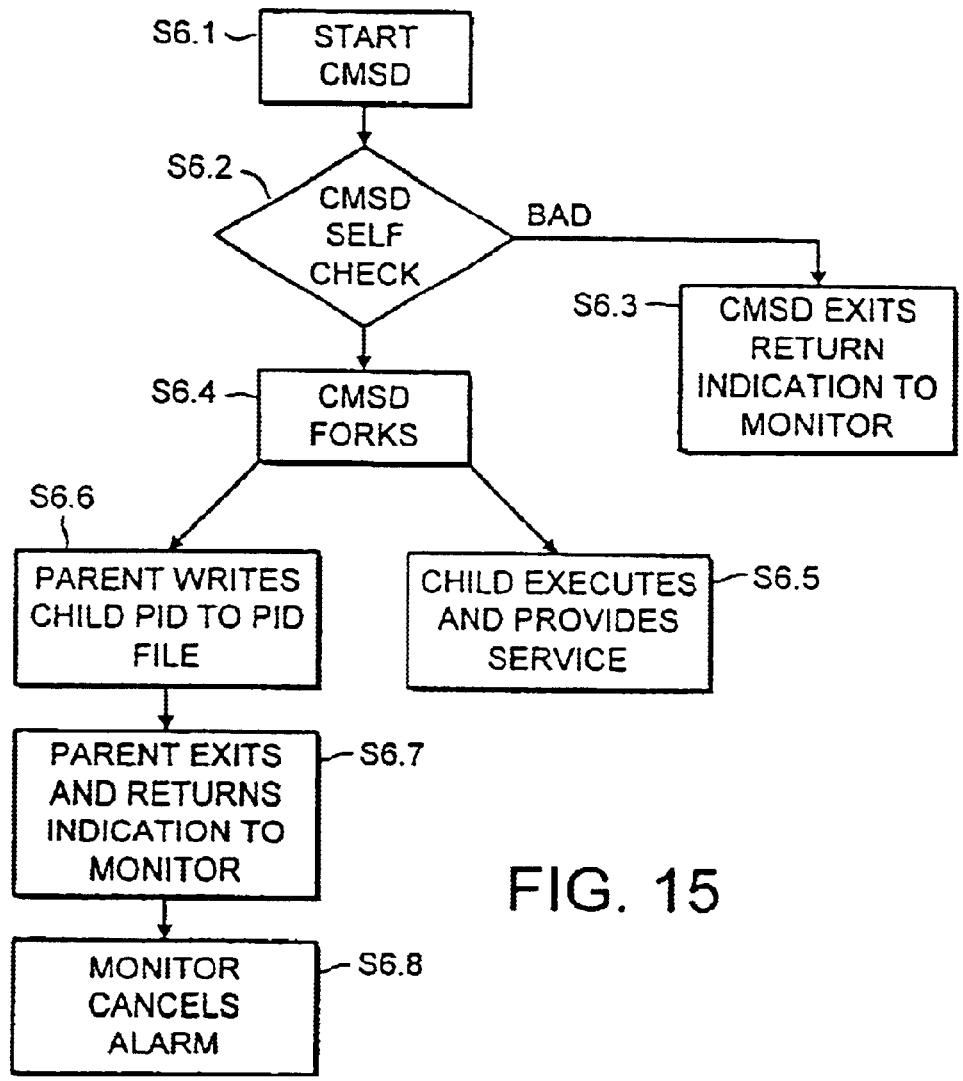
FIG. 15 illustrates details of the operation of the process monitor.

FIG. 15 illustrates step S6 of FIG. 14 in more detail. This corresponds essentially to the process represented in FIGS. 11, 12 and 13.

In step S6.1, the process monitor 460 starts the CMSD 400. In step S6.2 the CMSD 400 carries out self-checks as described with reference to FIG. 11, above. If the CMSD 400 is not operable, then the CMSD 400 exits at step S6.3 and a failed indication (e.g., a non-zero value) is returned to the monitor. Alternatively, if the CMSD 400 is operable, then in step S6.4 the CMSD 400 forks. The child CMSD 400 then executes in step S6.5 and provides appropriate CMSD services. In step S6.6 the parent CMSD 400 writes the child CMSD's PID to the PID file. The parent CMSD 400 then exits in step S6.7 and returns a successful indication (e.g., a zero value) that it can operate correctly to the process monitor 460. In step S6.8 the process monitor 460 cancels the alarm and sends a successful restart message. Otherwise, the alarm is not cancelled and an error message is generated to request intervention by a system operator. It can be seen that as a result of the above method, the CMSD 'backgrounds itself' (i.e. it forks, then the parent exits), so that the monitor is not the parent.

In the process illustrated in FIG. 14, a simple test as to the current status of the CMSD 400 is performed in step S4 by means of the process monitor 460 referring to the process table 470. As an alternative, this test could be replaced by a test in which the process monitor 460 tries to establish a connection to the CMSD 400 and reacts to a returned value indicative of whether the CMSD is active or not. Although this more direct approach will give a higher degree of certainty as to whether this CMSD 400 is operating correctly, or not, it will involve a higher system overhead than the more simple test of testing the process table 470 of the operating system. Accordingly, the simple test, which provides sufficient reliability, is preferred in the present embodiment of the invention.

It is to be noted that the CMSD 400 utilizes a process similar to that illustrated in FIG. 15 for handing over control to a new CMSD 400 in a situation where, for example, the CMSDEFs 410 are changed. The process utilized by the CMSD 400, which is illustrated in FIG. 16, ensures that the process monitor 460 can reliably be informed of the transfer of control from the old CMSD 400 to the new CMSD 400.

Figure 16:
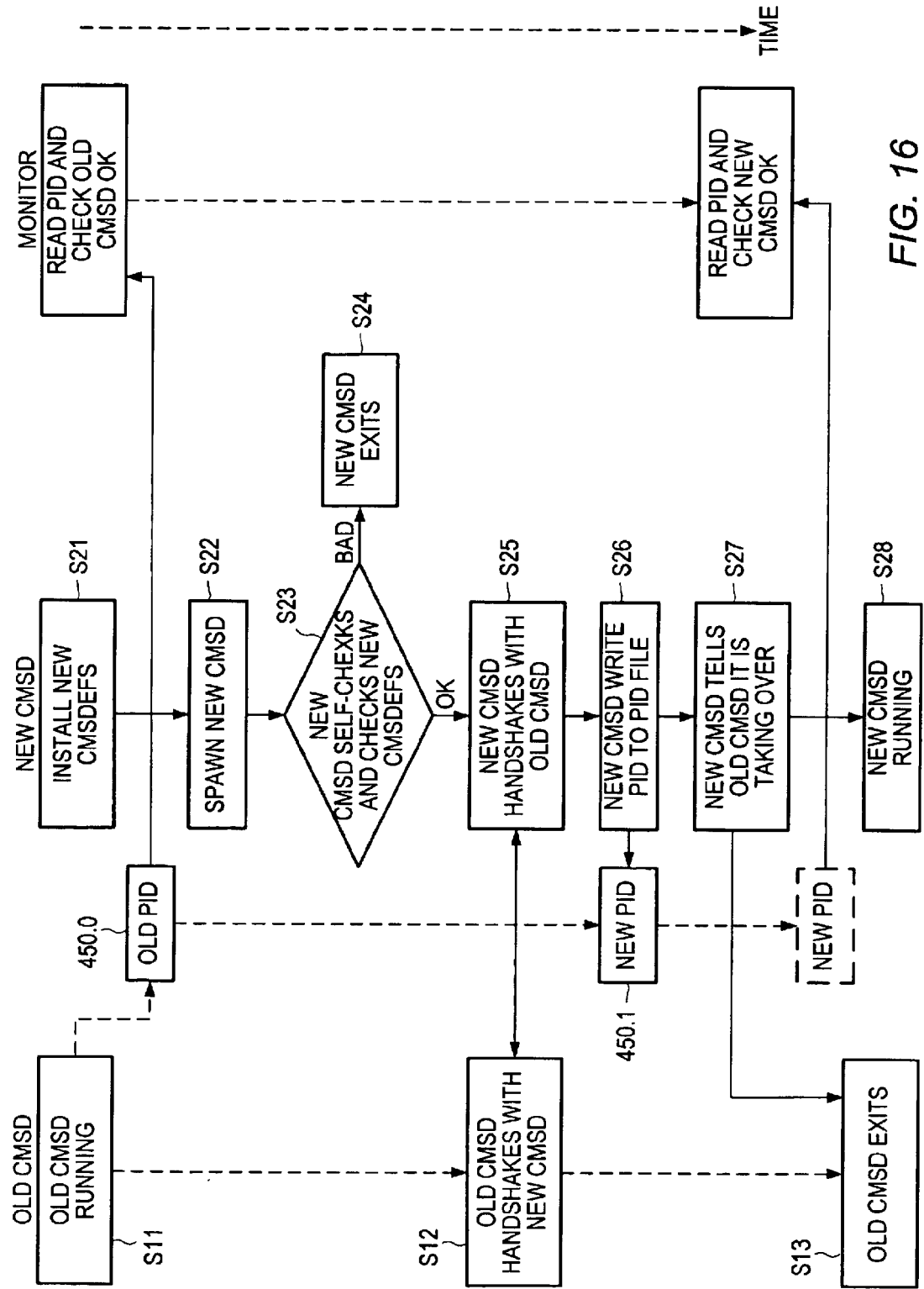
FIG. 16 is a flow diagram illustrating handing over of one process to another.

FIG. 16 illustrates various operations for an old CMSD process in the left-hand column, for a new CMSD process in the middle column and for the monitor process in the right hand column. Time increases from top to bottom in FIG. 16.

It is assumed in FIG. 16 that an existing (old) CMSD 400 is operating at S11 when new CMSDEFs 410 become available at S21. At that time, if the monitor process 400 reads the PID file 452, it will find the PID 450.0 for the old CMSD 400 and will check that the old CMSD is operating correctly.

An invocation of the CMSD 400 is associated with a particular set of CMSDEFs 410 in order to protect against errors in the CMSDEFs 410. Thus, it is necessary for a new CMSD 400 to be established to handle the new CMSDEFs 410. Accordingly, in step S22, a new CMSD 400 is spawned.

The new CMSD 400 then carries out self-checks at step S23 as before. If the new CMSD is non-operable, then the new CMSD exits at S24. Examples of situations where a new invocation of the CMSD 400 may not be able to execute correctly are where there is an error in the new CMSDEFs 410, or possibly where there is an error in a new version of the CMSD 400.

Alternatively, if the new CMSD is operable, the new CMSD 400 handshakes S12/S25 with the old CMSD 400. The new CMSD then writes its PID 450.1 to the PID file in step S26.

In step S27, the new CMSD tells the old CMSD that it is taking over and, in step S13, the old CMSD exits. In step S28 it is the new CMSD that is, therefore, running.

If, after step S26, the monitor process 460 reads the PID from the PID file, it will find the PID 450.1 for the new CMSD and will then check that the new CMSD is operating correctly.

It can also be seen from the above method that the new CMSD effectively 'backgrounds itself' and that the monitor is not the parent.

As mentioned above, the CMSD 400 is responsive to, and is operable to execute, CMSDEFs 410 for the current configuration of the system to be managed. The CMSD definitions 410 can be provided from a disk, or other storage medium forming part of the system, or can be supplied from a remote source. Configuration software in the form of scripts can also be used to generate configuration statements for configuring the CMSD 400. The configuration scripts can also be provided from a disk, or other storage medium forming part of the system, or can be supplied from a remote source. The CMSDEFs and scripts could also be provided from non-volatile storage in the FRUs inserted in the sockets in the chassis of the system.

The process monitor and/or the monitored process (CMSD) can be in the form of computer programs comprising computer code, or instructions, defining the functionality of the process monitor and/or monitored process, respectively. The process monitor and/or the CMSD can be provided on a carrier medium. The carrier medium can be any form of carrier medium for carrying computer program code, whether that be a magnetic, optical or any other form of data storage such as a tape, disk, solid state, or other form of storage providing random or read-only or any other form of access, or a transmission medium such as a telephone wire, radio waves, etc.

There follows a description of the manner in which the system can automatically be configured to take account of the FRUs, with their associated devices, which are inserted within the sockets of the chassis 200 of the system.

As mentioned earlier, the configuration management system of the present embodiment serves to provide high level fault tolerance monitoring for the fault tolerant computer system in that it models the interactions between the elements of the system and indeed manages the configuration of the system in response to user requirements. In order to be able to do this in an efficient manner, the component units and their constituent devices need to be configured in themselves and the computer system as a whole needs to be configured as regards, for example, the interactions between the units and/or the devices.

An advantageous method of auto-configuration of such components will be described hereinafter.

Figure 17:
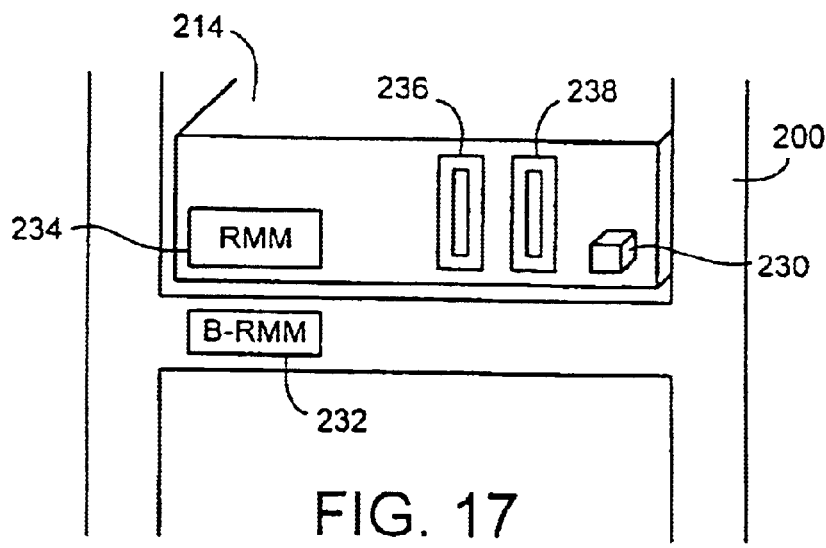
FIG. 17 is a schematic representation of a FRU in a chassis slot.

FIG. 17 illustrates a FRU 214, which is inserted in a slot 215 in the chassis 200. It can be seen that the FRU 214 carries a label 234 that can be matched to a label 232 adjacent to the slot 215 to assist in identification of the correct slot 215 for the FRU 214. As illustrated FIG. 17, the FRU 214 is an RMM FRU containing a tape drive 236 and a CD-ROM drive 238. The FRU 214 also includes a non-volatile memory 230 which contains configuration information to be used by the CMSD 400 in order correctly to configure the FRU 214 and its associated devices 236 and 238. In the present example of the invention, the non-volatile memory includes the following information:

EE.GEN.ID.PARTNO=5431
EE.GEN.ID.SERIALNO=9991
EE.MSP.FRUNAME=RMM
EE.MSP.DEV0.NAME=CDROM
EE.MSP.DEV0.SCSIID=0
EE.MSP.DEV1.NAME=TAPE
EE.MSP.DEV1.SCSIID=1

In a prior art FRU, only the part number from the information indicated above would have been present. In this embodiment, however, in addition to the part number, the non-volatile memory contains class information for the FRU, namely the FRUname: RMM. Other information is also provided as will be described later.

Figure 18:
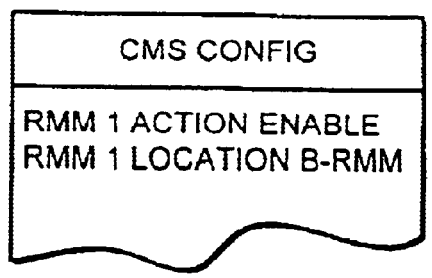
FIG. 18 represents a configuration file.

A component of the CMSD, forming a configuration (initialization) mechanism in the form of a program (CMSINITIALIZE) is operable to probe each slot, or FRU receiving location, of the chassis looking for the non-volatile memories 230. The class information for the FRU (here the FRU class name RMM) is used by the initialization component to derive a path to the CMS object definitions (CMSDEFs) for this class of FRU (here the RMM class). The CMSDEFs can include initialization code (initialization scripts) which are specific to the class of FRU and are operable on receipt of the FRU class and an instance number generated by the initialization component, to produce configuration information (configuration scripts) which are then stored in the CMS configuration file 404, which is held in system storage. If required, the initialization code can further access the FRU memory for further information needed to generate the initial configuration information. The configuration statements typically comprise an object class (e.g. RMM) and instance number (e.g. 1), an attribute (e.g. Action) and a value (e.g. enable). An example of entries in a CMS configuration file for the FRU 214 of FIG. 17 is illustrated in FIG. 18.

Figure 19:
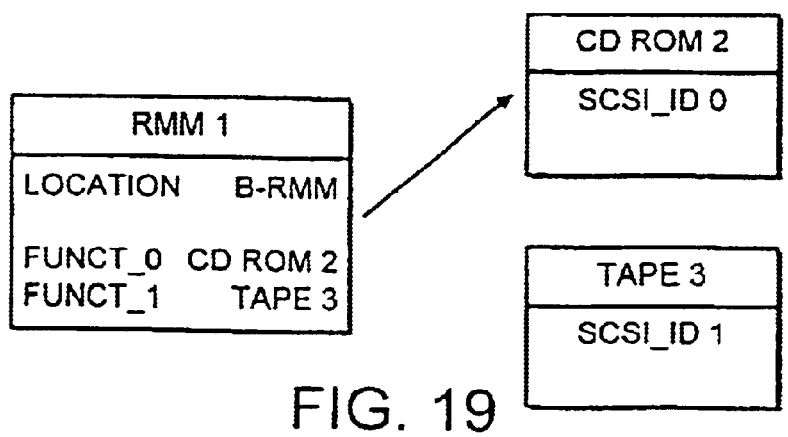
FIG. 19 represents an example of CMSDEFs and associated instances and attributes.

Once the CMS configuration table has been established and the initial checks have been completed, the CMSD is then able to establish which FRUs exist from the information stored in the CMS configuration file. In order correctly to set the device instances for the tape and CD ROM, the CMS "CMSDEFS" will further interrogate RMM FRU. The CMS model of the FRU and its devices are dynamically created from the information in the non-volatile memory 230. FIG. 19 illustrates an example of the CMSDEF's instances and attributes for the example FRU shown in FIG. 17.

Figure 20:
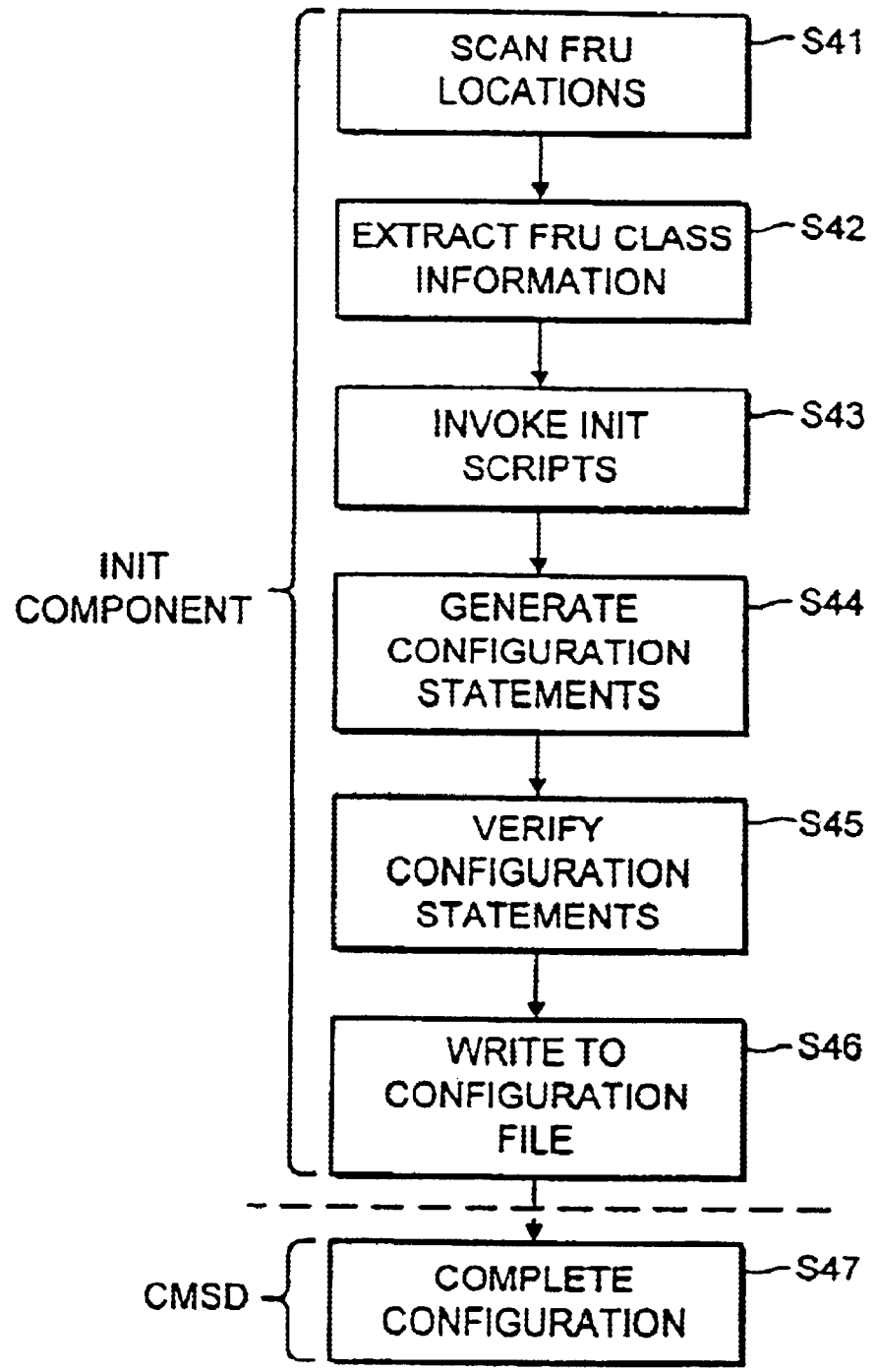
FIG. 20 is a flow diagram illustrating the process of configuring a FRU.

FIG. 20 is a flow diagram in summarizing the operation of a CMS initialization component 402 for initially configuring the FRU into the system, as described with reference to FIG. 17 to 19. In an embodiment of the invention, this is only operable on the first initialization of the system, with the configuration file providing the necessary information on subsequent initializations. The use of a configuration file is preferred in the present fault tolerant system as it provides continuity between initializations and assists in identifying faults. It should be appreciated that in other systems, however, it may be desired to carry out this process at other times.

In step S41, the CMS initialization component 500 scans the FRU receiving locations looking for non-volatile memory elements 320. As a result, when a FRU is inserted in such a receiving location, and before the FRU devices become integrated within the system, the CMS initialization component is able to detect the presence of that FRU.

In step S42, when the CMS initialization component identifies a non-volatile memory element in the FRU in a receiving location, it extracts the FRU class information (e.g., the FRU class name) provided therein.

This FRU class information is then used in step S43 by the CMS initialization component to access the initialization code (scripts) for the class identified by the class information. As indicated, the initialization scripts can be associated with the CMSDEFs for that class of FRU.

In step S44 the initialization scripts produce the configuration statements for the FRU as described with reference to FIG. 18. If required, this step can involve the initialization code accessing the non-volatile memory in the FRU.

The configuration statements output by the initialization scripts are verified by the initialization component in step S45 (this could be effected by a separate component of the CMS).

If the initialization component detects any errors during this checking, it discards all code lines associated with the FRU concerned. This is to ensure that the CMSD can start and so that subsequent corrective action can be undertaken. Otherwise, if the configuration statements check out, then the configuration statements are written to the configuration file 404 in step S46. Once all of the configuration statements have been stored in the CMS configuration file, and this all checks out, the control can be passed to the configuration system daemon.

The CMSD then completes the configuration of the system in step S47, including configuration of the FRU devices, as illustrated in FIG. 19. As part of the process it accesses the FRU memory, if required, to extract device class information and further device information. The CMSD is then able to configure the FRU devices as defined by the CMSDEFs and/or scripts. The CMSD is operable automatically to generate at least the physical and device hierarchies referenced in FIGS. 7 and 8 by establishing links between the various objects in accordance with the information in the CMSDEFs, which includes declarations for objects managed by the CMSD, state evaluations (statements for evaluating the states of objects), and transition code that is executed when a transition occurs between the states of an object. The service hierarchy may be partially configured with operator intervention (e.g., to specify specific services as required by the user).

This two-stage process enables the creation of a database for providing a representative state for starting the CMSD.

There has, therefore, been described a configuration management system which can enable automatic configuration of FRUs and their associated devices.

The memory in the FRUs can be used to store additional data other than that used specifically for the configuration processes described. For example, it can additionally be used to store certain status information relating to the system operation, in order that the state of the system can be consistent across re-starts. Also it can be used to store a history for the unit. This information could then be used off-line at some later stage, (for example on return of an allegedly faulty FRU) to establish whether it is the FRU or, perhaps, a slot in which it has been inserted, which is faulty.

There has been described a configuration management system including a configuration management system daemon (CMSD). The continued correct functioning of the CMSD can be ensured by detecting the failure of the CMSD and restarting the CMSD as appropriate. Thrashing of the system caused by continual, rapid attempts to restart a CMSD that would never execute successfully can be avoided.

It will be appreciated that although particular embodiments of the invention have been described, many modifications/additions and/or substitutions may be made within the spirit and scope of the present invention as defined in the appended claims.

For example, although an example of the invention has been described in the context of a fault tolerant computing system, it is not limited in its application to such a system. Indeed, it could indeed find application in any system where it is desirable to monitor the operation of a potentially critical process, for example a process controlled by a daemon program. Also, although in the preferred embodiments the process monitor and the monitored process (CMSD) are implemented by program code, it will be appreciated that they could, at least in part, be implemented by means of special purpose hardware, for example using one or more special purpose circuits, such as application specific integrated circuits (ASICs).

Accordingly, the particular example described is intended to be illustrative only, and not limitative.

What is claimed is:

1. A method of automatic configuration of a unit forming a component of an apparatus, the method comprising:
   a) accessing class information held in the unit on insertion of the unit into the apparatus prior to integrating the unit functionally in the apparatus, said class information representing an object class for the unit;
   b) using the accessed class information to reference, in storage in the apparatus separate from the unit, object definitions for the class of unit, which object definitions include initialization code operable on receipt of the accessed class information to produce configuration information operable to produce object configuration statements for the unit, that comprise at least one of the following: the object class for the unit; an object instance number; an attribute name; and a value for the attribute; and
   c) verifying the validity of the configuration information and, when the configuration information is valid, storing the configuration information in a configuration file for the apparatus including a location of the unit in the apparatus to enable functional integration of the unit in the apparatus.

2. The method of claim 1, further comprising accessing the unit when the unit is functionally integrated in the apparatus for further configuration data held therein.

3. The method of claim 2, wherein the further configuration data comprises a device object class and device object attributes for a device of the unit.

4. The method of claim 1, wherein the class information is held in non-volatile memory in the unit.

5. The method of claim 1 for configuring a plurality of units for a configuration management system, wherein the class information identifies at least one configuration management system class for the unit.

6. The method of claim 1, said apparatus having a plurality of locations for receiving a said unit and wherein the method comprises probing each said location in the apparatus for class information held in a unit at that location.

7. The method of claim 6, wherein, in step (c), a set of object configuration statements for respective units are stored in the configuration file.

8. The method of claim 1, wherein the unit is a field replaceable unit.

9. Apparatus comprising:
   a plurality of units that each include unit storage for holding class information for the unit that represents an object class for the unit; and
   a configuration mechanism operable to:
   a) access class information held in the unit on insertion of the unit into the apparatus prior to integrating the unit functionally in the apparatus, said class information representing an object class for the unit;
   b) use the accessed class information to reference, in storage in the apparatus separate from the unit, object definitions for the class of unit, which object definitions include initialization code operable on receipt of the accessed class information to produce object configuration statements for the unit, that comprise at least one of the following: the object class for the unit; an object instance number; an attribute name; and a value for the attribute; and
   c) verify the validity of the configuration information and, when the configuration information is valid, store the configuration information in a configuration file for the apparatus including a location of the unit in the apparatus to enable functional integration of the unit in the apparatus.

10. The apparatus of claim 9, wherein the unit storage comprises non-volatile memory.

11. The apparatus of claim 10, wherein the non-volatile memory is an EEPROM.

12. The apparatus of claim 9, wherein the configuration mechanism is responsive to derived configuration information to verify the validity of the configuration information prior to storage thereof in the system storage.

13. The apparatus of claim 9, wherein the configuration mechanism is part of a configuration management system and the class information identifies at least one configuration management system class for the unit.

14. The apparatus of claim 13, comprising a chassis for a plurality of units locatable within the chassis.

15. The apparatus of claim 14, wherein the configuration mechanism probes each location in the apparatus for receiving a said unit for accessing class information held in a said unit at that location.

16. The apparatus of claim 15, comprising a configuration file in system storage for persistent storage of a set of object configuration statements for respective units.

17. The apparatus of claim 9, wherein a said unit is a field replaceable unit.

18. The apparatus of claim 9, forming a computer system.

19. The apparatus of claim 18, wherein the computer system is a fault-tolerant computer system.

20. A configuration management system operable on apparatus that includes a plurality of units that each have unit storage for holding class information that represents an object class for the unit, the configuration management system comprising an initialization component configured to:
   a) access class information held in the unit on insertion of the unit into the apparatus prior to integrating the unit functionally in the apparatus, said class information representing an object class for the unit;
   b) use the accessed class information to reference, in storage in the apparatus separate from the unit, object definitions for the class of unit, which object definitions include initialization code operable on receipt of the accessed class information to produce object configuration statements for the unit, that comprise at least one of the following: the object class for the unit; an object instance number; an attribute name; and a value for the attribute; and
   c) verify the validity of the configuration information and, when the configuration information is valid, store the configuration information in a configuration file for the apparatus including a location of the unit in the apparatus to enable functional integration of the unit in the apparatus.

21. The configuration management system of claim 20, wherein the initialization component is configured to probe each location in the apparatus for receiving a unit and, when a location is occupied by a unit, to read class information from storage in the unit.

22. The configuration management system of claim 20, wherein the initialization component is configured to access class information from a unit on insertion of the unit into the apparatus and to generate object definitions for the unit prior to functional integration of the unit.

23. A carrier medium carrying program means embodying a configuration management operable on apparatus that includes a plurality of units that each have unit storage for holding class information that represents an object class for the unit, the configuration management system comprising an initialization component configured to:

a) access class information held in the unit on insertion of the unit into the apparatus prior to integrating the unit functionally in the apparatus, said class information representing an object class for the unit;

b) use the accessed class information to reference, in storage in the apparatus separate from the unit, object definitions for the class of unit, which object definitions include initialization code operable on receipt of the accessed class information to produce object configuration statements for the unit, that comprise at least one of the following: the object class for the unit; an object instance number; an attribute name; and a value for the attribute; and c) verify the validity of the configuration information and, when the configuration information is valid, store the configuration information in a configuration file for the apparatus including a location of the unit in the apparatus to enable functional integration of the unit in the apparatus.

24. The carrier medium of claim 23, wherein the storage is operable to record status information relating to system operation for providing an operating history for the unit.

* * * * *